United States Patent
Wyld et al.

(10) Patent No.: US 12,418,855 B2
(45) Date of Patent: Sep. 16, 2025

(54) TECHNIQUES FOR ELECTING A LEADER DEVICE IN A NETWORK OF USER DEVICES

(71) Applicant: Apple Inc., Cupertino, CA (US)

(72) Inventors: Jeremy A. Wyld, San Diego, CA (US); John J. Iarocci, Los Gatos, CA (US); Jared S. Grubb, Seattle, WA (US)

(73) Assignee: Apple Inc., Cupertino, CA (US)

( * ) Notice: Subject to any disclaimer, the term of this patent is extended or adjusted under 35 U.S.C. 154(b) by 584 days.

(21) Appl. No.: 17/698,528

(22) Filed: Mar. 18, 2022

(65) Prior Publication Data

US 2022/0303888 A1  Sep. 22, 2022

Related U.S. Application Data

(60) Provisional application No. 63/164,491, filed on Mar. 22, 2021.

(51) Int. Cl.
| | |
|---|---|
| *H04W 48/18* | (2009.01) |
| *H04W 24/08* | (2009.01) |
| *H04W 24/10* | (2009.01) |
| *H04W 76/10* | (2018.01) |
| *G16Y 30/00* | (2020.01) |
| *H04W 84/20* | (2009.01) |

(52) U.S. Cl.
CPC .......... *H04W 48/18* (2013.01); *H04W 24/08* (2013.01); *H04W 24/10* (2013.01); *H04W 76/10* (2018.02); *G16Y 30/00* (2020.01); *H04W 84/20* (2013.01)

(58) Field of Classification Search
None
See application file for complete search history.

(56) References Cited

U.S. PATENT DOCUMENTS

| | | | |
|---|---|---|---|
| 7,738,504 B1 * | 6/2010 | Deaner | H04L 69/40 |
| | | | 709/208 |
| 9,392,468 B1 * | 7/2016 | Marupaduga | H04W 16/28 |
| 9,781,042 B2 * | 10/2017 | Yao | H04L 45/745 |
| 10,244,542 B2 | 3/2019 | Athani | |
| 10,356,064 B1 * | 7/2019 | Howard | H04L 63/0428 |
| 10,616,751 B1 * | 4/2020 | Kanellakis | H04W 8/005 |
| 10,810,093 B1 | 10/2020 | Tucek | |
| 11,089,352 B1 * | 8/2021 | Bartholomew | H04N 21/4307 |
| 2005/0094574 A1 * | 5/2005 | Han | H04W 40/32 |
| | | | 370/254 |
| 2010/0046426 A1 * | 2/2010 | Shenoy | H04L 67/12 |
| | | | 370/328 |
| 2010/0144283 A1 * | 6/2010 | Curcio | H04W 4/02 |
| | | | 455/66.1 |

(Continued)

*Primary Examiner* — Otis L Thompson, Jr.
(74) *Attorney, Agent, or Firm* — Kilpatrick Townsend & Stockton LLP

(57) ABSTRACT

Techniques are disclosed for selecting a leader device from a cluster of user devices. In one example, a user device determines a series of metrics specifying capabilities of the user device. The user device can obtain a number of user identifiers (UIDs) from other user devices in the cluster providing respective series of metrics specifying capabilities of the other user devices in the cluster. The user device can select a leader device based on a comparison of metrics for each user device as provided in the UIDs for the user devices. The user device can then notify the other user devices in the cluster of the selected leader device.

20 Claims, 7 Drawing Sheets

(56) References Cited

U.S. PATENT DOCUMENTS

| | | | |
|---|---|---|---|
| 2013/0064102 A1* | 3/2013 | Chang | H04L 49/70 |
| | | | 370/255 |
| 2015/0138950 A1* | 5/2015 | Ma | H04L 41/0654 |
| | | | 370/223 |
| 2015/0350374 A1* | 12/2015 | Soneda | H04W 40/02 |
| | | | 714/4.12 |
| 2016/0143077 A1* | 5/2016 | Fodor | H04W 56/001 |
| | | | 370/329 |
| 2018/0060248 A1* | 3/2018 | Liu | H04L 67/568 |
| 2018/0224819 A1* | 8/2018 | Noboa | G05B 19/0423 |
| 2018/0227387 A1* | 8/2018 | Gersons | H04L 67/535 |
| 2019/0230740 A1* | 7/2019 | Porter | H04W 56/0015 |
| 2019/0364492 A1 | 11/2019 | Azizi et al. | |
| 2020/0236164 A1 | 7/2020 | Anand et al. | |
| 2022/0157318 A1* | 5/2022 | Sharifi | G10L 15/22 |
| 2022/0415152 A1* | 12/2022 | Choe | G06Q 10/10 |

\* cited by examiner

TECHNIQUES FOR ELECTING A LEADER DEVICE IN A NETWORK OF USER DEVICES

CROSS-REFERENCE TO RELATED APPLICATION(S)

The present application claims priority to U.S. Provisional Patent Application No. 63/164,491, titled "TECHNIQUES FOR ELECTING A LEADER DEVICE IN A NETWORK OF USER DEVICES," and filed Mar. 22, 2021, the entirety of which is incorporated by reference herein.

BACKGROUND

Many network environments include multiple devices capable of performing various processing tasks. For example, a network environment can include a combination of computing devices, mobile devices, sensors, internet of things (IoT) devices, etc. In some instances, the devices in a network environment can be separated into clusters of devices within the network environment and assigned to a leader within each cluster. One or more of the clusters can work together to manage an automated environment within the network. However, given the many various types of devices and processing tasks, many challenges exist in managing the automated environment.

BRIEF SUMMARY

Embodiments of the present disclosure can provide methods, systems, and computer-readable media for selecting a leader device in a cluster of user devices. In some examples, a user device can select a leader device in a cluster based on a series of metrics derived for each user device in the cluster.

According to one embodiment, a method may be executed by a user device in the cluster. The user device can be a network-accessible device such as a smartphone, a tablet, smart television (TV) media streaming device, a smart hub speaker, or the like. The user device may receive information identifying one or more devices in the cluster of devices. The user device can use the information to establish a connection with the other devices in the cluster.

The user device may determine a series of metrics that relate to the user device. The series of metrics can include any of: an ephemeral metric estimating a likelihood that the user device will maintain the connection with the cluster for over a threshold amount of time, a software metric identifying a software version installed on the user device, a class metric identifying a device class of the user device, a network metric identifying a network capability of the user device, a power metric identifying a power capability of the user device, and a thermal metric identifying a processing capability of the user device prior to the user device shutting down due to overheating. Each device in the cluster of user devices can determine a series of metrics specific to the user device.

Each user device can generate a user identifier (UID) for the user device that provides the series of metrics for the user device. The user device can receive the other UIDs from each user device of the cluster of other user devices. The user device can compare the UID of the user device and each of the respective other UIDs from each user device of the cluster of other user devices to determine a leader device of the cluster of user devices. This can include arranging the series of metrics for each user device by metric type and assigning an order and/or ranks to metrics for each user device. The user device can notify the other devices in the cluster of the selected leader device and the selected leader device can perform processing tasks such as directing data packets across the user devices in the cluster of user devices and coordinating state information of the cluster of user devices, for example.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

The present embodiments relate to selection of a leader device within a cluster of devices based on a processing derived metrics for the devices in the cluster. A device can obtain a user identifier (UID) from devices in the cluster and process metrics specified in the UIDs to determine a leader device in the cluster. The selected leader device can perform various processing tasks as described herein, such as to direct requests to process data to devices in the cluster or facilitate coordination of processes between devices in the cluster.

Figure 1:
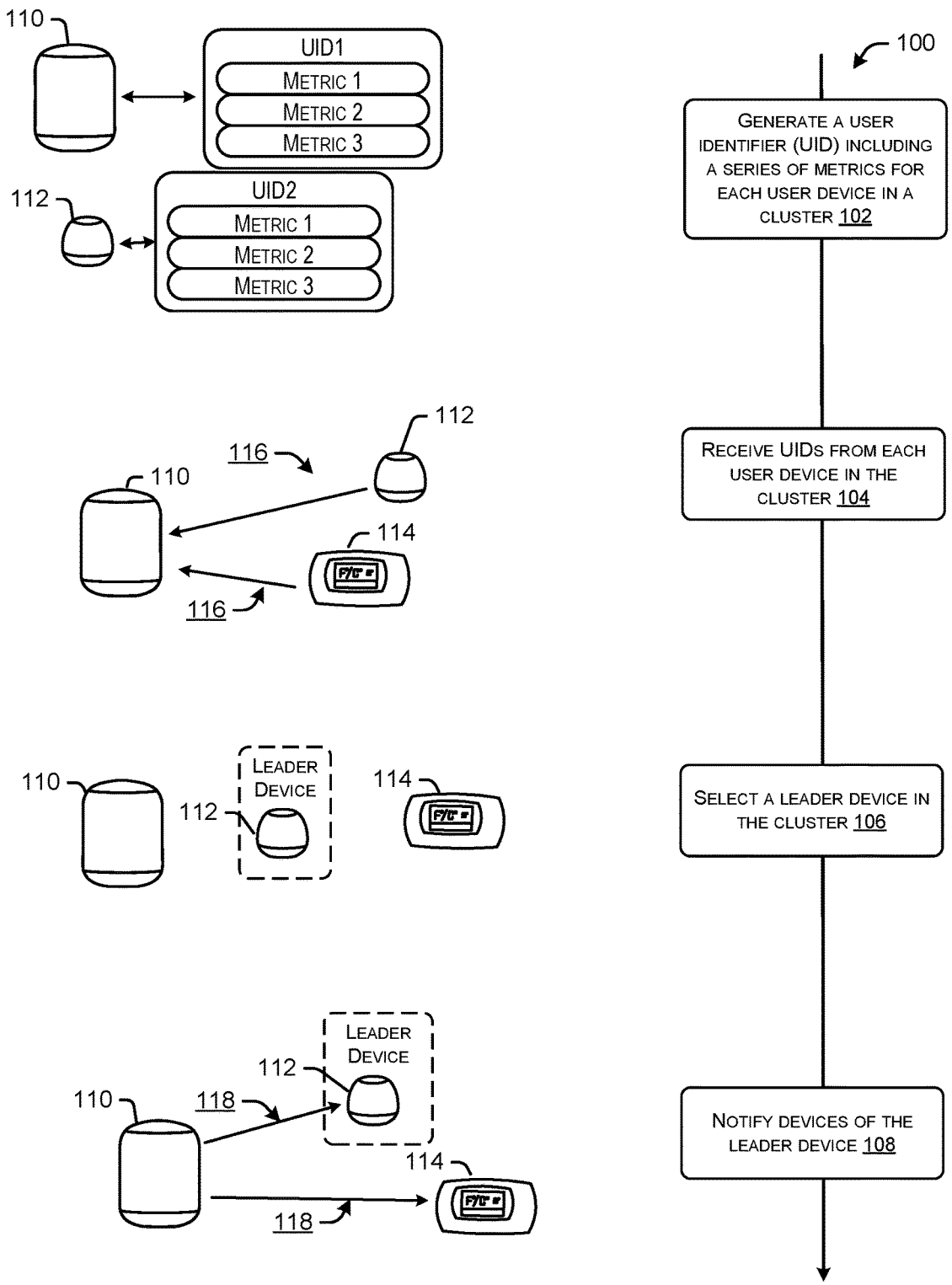
FIG. 1 illustrates a flow process for selecting a leader device, according to some embodiments.

FIG. 1 illustrates a flow process 100 for selecting a leader device, according to some embodiments. A user device can establish a connection with other user devices in the cluster. The user devices can include various network-accessible devices, such as a mobile phone, a computing device, a voice-enabled hub device, an internet of things (IoT) device (e.g., video streaming device, smart thermostat, video-enabled doorbell), etc.

At block 102, a series of metrics for the devices in the cluster can be determined. The series of metrics can specify various features or capabilities for each device in the cluster. For example, a user device (e.g., device 110, device 112) can determine an ephemeral metric that identifies a likelihood that the user device will maintain the connection with the cluster for over a threshold amount of time, a software metric that identifies a software version installed on the user device, a class metric that identifies a device class of the user device, a network metric that identifies whether the user device is connected to the network via a wired connection or a wireless connection, a power metric that identifies whether the user device is in a low power mode, and a thermal metric that identifies a likelihood that the user device will be shut down due to overheating. The derived metrics can be compared with metrics of other devices in the cluster for determining a leader device for the cluster. A UID (e.g., UID1, UID2) for each user device can be generated based on the series of metrics for each user device.

At block 104, the user device 110 can obtain other UIDs 116 from other devices in the cluster (e.g., device 112, device 114). The user identifier can include an ordered tuple identifying the derived metrics. The UIDs can specify the determined metrics and can be used for determining the leader of the cluster.

The ordered tuple included in the UID can specify an order or priority of metric types for selection of a leader device. As an illustrative example, the ordered tuple can specify an order comprising the ephemeral metric, the software metric, the class metric, the network metric, the power metric, the thermal metric, and the entropy metric. In this example, the ephemeral metric can comprise a first priority in the order.

As described in greater detail below, the ephemeral metric can quantify a likelihood that the device will leave (e.g., become disconnected by physically moving) the cluster of devices within a time period. For instance, a mobile phone may include a greater ephemeral metric than a video streaming device plugged into a television, as the mobile device is more likely to leave the network than the video streaming device. An ephemeral metric in each UID can be identified and compared with other ephemeral metrics to select a leader device.

The leader device can be selected based on any number of metrics as specified in the order. For example, the ephemeral metrics for each device can be compared to select a leader device with a lowest ephemeral metric (e.g., specifying a lower likelihood of leaving the network). Leader selection can include comparing metrics of a first metric type (e.g., the ephemeral metric) as specified in an order (e.g., the order as specified in the ordered tuple of each UID). Further, the metrics can be assigned ranks to rank each user device in the cluster by metric type.

At block 106, the user device 110 can determine a leader device for the cluster. For example, user device 110 can select device 112 as the leader device based on the series of metrics of each user device provided in the UIDs. As described in greater detail below, ranks can be assigned to user devices by each metric type and a user device can be selected as the leader device based on assigned ranks for each user device. At block 108, the user device 110 can notify other devices 112, 114 of the leader device in a leader notification message 118.

Determining a leader device using a series of derived metrics relating to capabilities of each user device can increase the efficiency of selecting the leader device and the efficiency of performance of processing tasks by the selected leader device. For example, the selected leader device can comprise a device that is less ephemeral in nature (e.g., less likely to leave the network environment) and can include available processing and network resources to perform processing tasks specific to the leader device. Rather than randomly selecting a leader device, the present embodiments can efficiently select a leader device that is capable of performing the processing tasks specific to the selected leader device.

In some instances, the leader device can be dynamically updated responsive to the leader device leaving the cluster or another device entering the cluster. As described in greater detail below, dynamically changing the leader device based on a specific set of performance metrics can increase the efficiency of the leader device in performing tasks. For example, instead of selecting an ephemeral device that leaves the network or a device that can overheat if tasked with processing capabilities, the present embodiments can select a leader device to perform the tasks.

I. NETWORK ENVIRONMENT

Figure 2:
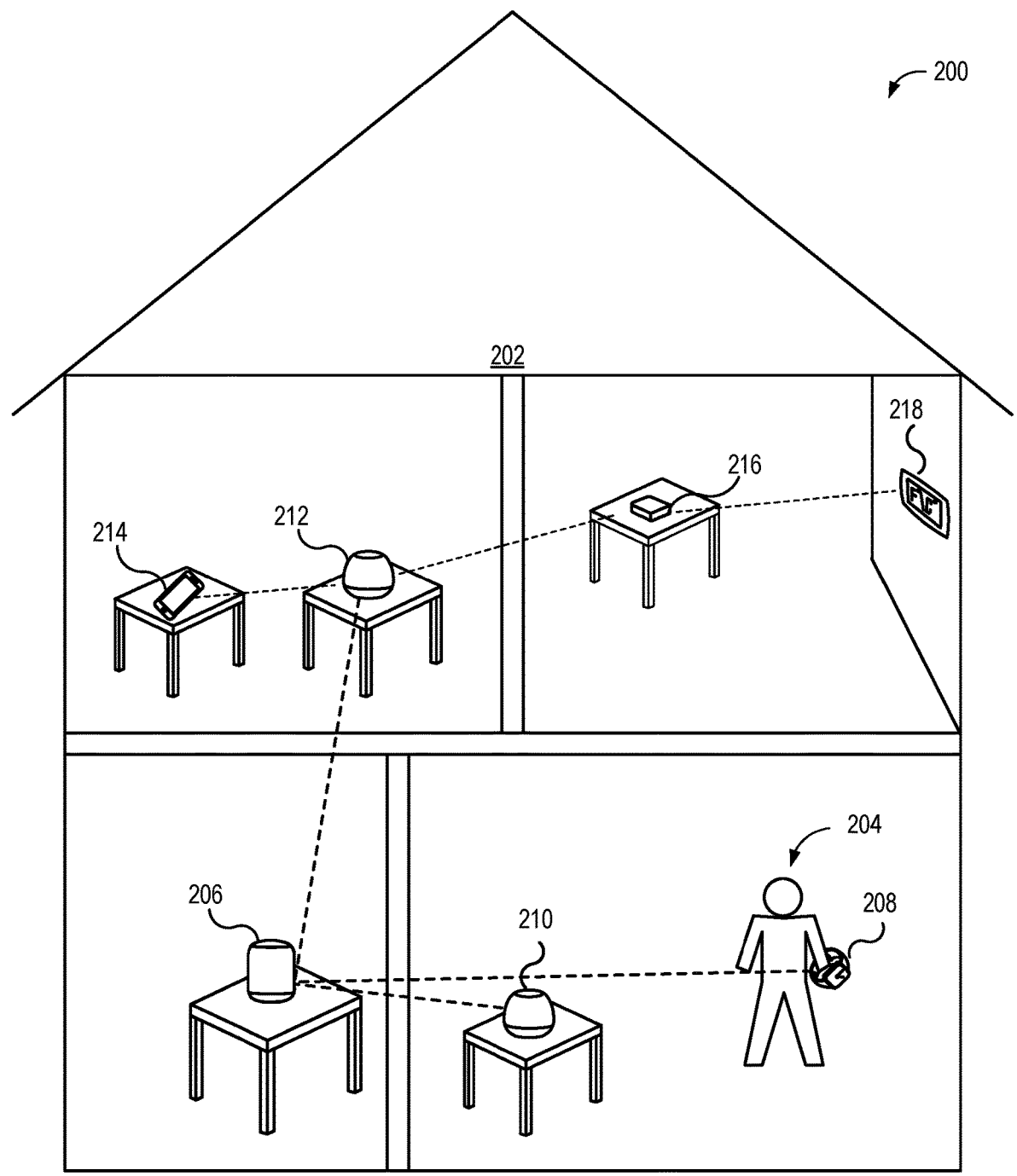
FIG. 2 illustrates an example network environment that includes a cluster of devices, according to some embodiments.

FIG. 2 illustrates an example network environment 200 that includes a cluster of devices, according to some embodiments. The network environment (e.g., a house, a building) can include a number of clusters of devices. Each cluster can include a subset of devices in the network environment. For example, each cluster can include a number of devices within a region of the network environment (e.g., within a room of a building). As another example, a cluster can include a number of devices associated with a common user account or include devices that are registered to the user account.

In the embodiment as shown in FIG. 2, the device cluster 202 can include a number of devices. For example, the cluster 202 can include leader device 206 and devices 206, 208, 210, 212, 214, 216, 218. Data can be transmitted between devices in the cluster 202. In some embodiments, data can be forwarded between multiple devices, forming a mesh network. For instance, leader device 206 can communicate with device 218 via devices 212, 216 via the mesh network. Devices in the cluster 202 can communicate with external devices via a network (e.g., the internet, a cellular communication network).

As described in greater detail below, the leader device 206 can be selected based on metrics relating to each user device. The selected leader device 206 can direct data between devices in the cluster 202. The leader device 206 can coordinate state information (e.g., whether a device is active/inactive, whether an alert is triggered by a device) between the devices in the cluster 202. Further, the leader device can dynamically change to another device in the cluster periodically or responsive to a change to the devices in the cluster 202.

Figure 3:
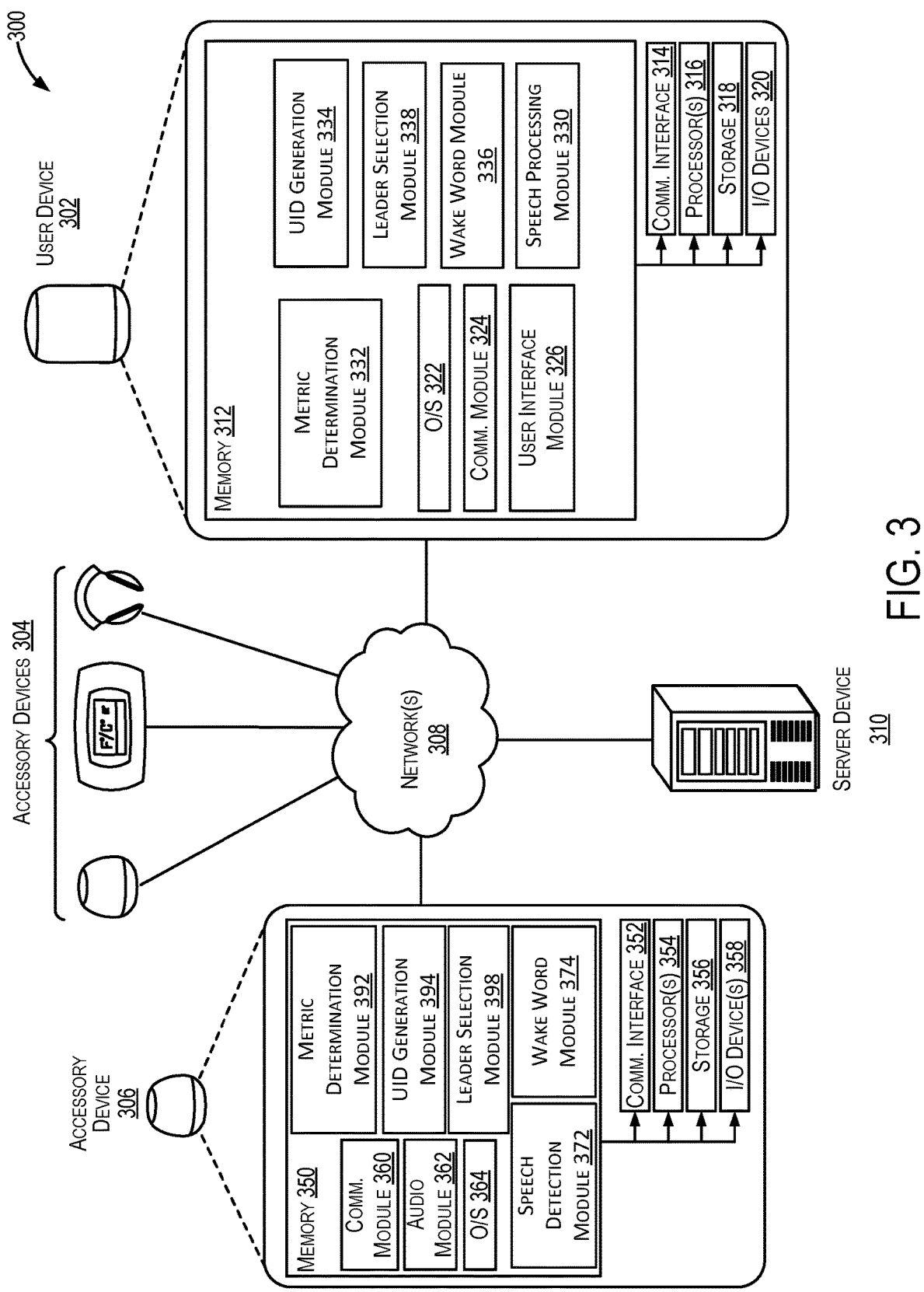
FIG. 3 is a simplified block diagram illustrating example architecture of a system used to detect and act upon a user request, according to some embodiments.

FIG. 3 is a simplified block diagram 300 illustrating an example architecture of a system used to detect and act upon a user request, according to some embodiments. The diagram includes a representative user device 302, one or more accessory devices 304, a representative accessory device 306, one or more network(s) 308, and a server device. Each of these elements depicted in FIG. 3 may be similar to one or more elements depicted in other figures described herein. In some embodiments, at least some elements of diagram 300 may operate within the context of a home environment (e.g. network environment 200 of FIG. 2).

The accessory devices 304 and representative accessory device 306 may be any suitable computing device (e.g., smart speaker, smartwatch, smart thermostat, camera, etc.). In some embodiments, an accessory device may perform any one or more of the operations of accessory devices described herein. Depending on the type of accessory device and/or location of the accessory device (e.g., within the home environment or outside the home environment), the accessory device may be enabled to communicate using one or more network protocols (e.g., a Bluetooth connection, a Thread connection, a Zigbee connection, a Wi-Fi connection, etc.) and network paths over the network(s) 308 (e.g., including a LAN or WAN), described further herein.

In some embodiments, the server device 310 may be a computer system that comprises at least one memory, one or more processing units (or processor(s)), a storage unit, a communication device, and an I/O device. In some embodiments, the server device 310 may perform any one or more of the operations of server devices described herein. In some embodiments, these elements may be implemented similarly (or differently) than as described in reference to similar elements of user device 302.

In some embodiments, the representative user device 302 may correspond to any one or more of the user devices described herein. For example, the user device 302 may correspond to one or more of the user devices of the cluster of devices as illustrated in FIG. 2. The representative user device may be any suitable computing device (e.g., a mobile phone, tablet, a smart hub speaker device, a smart media player communicatively connected to a TV, etc.).

In some embodiments the one or more network(s) 308 may include an Internet WAN and a LAN. As described herein, the home environment may be associated with the LAN, whereby devices present within the home environment may communicate with each other over the LAN. As described herein, the WAN may be external from the home environment. For example, a router associated with the LAN (and thus, the home environment) may enable traffic from the LAN to be transmitted to the WAN, and vice versa. In some embodiments, the server device 310 may be external to the home environment, and thus, communicate with other devices over the WAN.

As described herein, user device 302 may be representative of one or more user devices connected to one or more of the network(s) 308. The user device 302 has at least one memory 312, a communications interface 314, one or more processing units (or processor(s)) 316, a storage unit 318, and one or more input/output (I/O) device(s) 320.

Turning to each element of user device 302 in further detail, the processor(s) 316 may be implemented as appropriate in hardware, computer-executable instructions, firmware or combinations thereof. Computer-executable instruction or firmware implementations of the processor(s) 316 may include computer-executable or machine executable instructions written in any suitable programming language to perform the various functions described.

The memory 312 may store program instructions that are loadable and executable on the processor(s) 316, as well as data generated during the execution of these programs. Depending on the configuration and type of user device 302, the memory 312 may be volatile (such as random access memory ("RAM")) or non-volatile (such as read-only memory ("ROM"), flash memory, etc.). In some implementations, the memory 312 may include multiple different types of memory, such as static random access memory ("SRAM"), dynamic random access memory ("DRAM") or ROM. The user device 302 may also include additional storage 318, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 318 may be utilized to store data contents received from one or more other devices (e.g., server device 310, other user devices, accessory devices 304, or the representative accessory device 306). For example, the storage 318 may store accessory management settings, accessory settings, and user data associated with users affiliated with the home environment.

The user device 302 may also contain the communications interface 314 that allows the user device 302 to communicate with a stored database, another computing device or server, user terminals, or other devices on the network(s) 308. The user device 302 may also include I/O device(s) 320, such as for enabling connection with a keyboard, a mouse, a pen, a voice input device, a touch input device, a display, speakers, a printer, etc. In some embodiments, the I/O devices(s) 320 may be used to output an audio response or other indication as part of executing the response to a user request.

The memory 312 may include an operating system 322 and one or more application programs or services for implementing the features disclosed herein, including a communications module 324, a user interface module 326, a metric determination module 332, a UID generation module 334, a leader selection module 338, and a wake word module 336.

The communications module 324 may comprise code that causes the processor(s) 316 to generate instructions and messages, transmit data, or otherwise communicate with other entities. For example, the communications module 324 may transmit and receive data associated with accessory settings, accessory management settings, accessory scoring from accessory devices 304, 306, other user devices, or the server device 310. As described herein, the communications module 324 may transmit messages via one or more network paths of network(s) 308 (e.g., via a LAN associated with the home environment or an Internet WAN).

The user interface module 326 may comprise code that causes the processor(s) 316 to present information corresponding to the accessory devices and user devices present within a home environment. For example, the user interface module 326 can present a graphical representation of user devices and the accessory devices currently associated with each accessory device. In some embodiments, the user interface module 326 can allow a user to provide configuration information about a new accessory device to be added to a home environment or allow the user to select user devices or accessory devices for removal from the home environment.

The speech processing module 330 can comprise code that causes the processor(s) 316 to receive and process an audio input corresponding to speech or other sound amenable to analysis by techniques described herein. Wake word module 336 can comprise code that causes processor(s) 316 to receive and process a portion of an audio input corresponding to a trigger or wake word. For example, wake word module 336 can analyze a portion of an audio input to determine the presence of a wake word. The speech processing module can also, in some embodiments, determine a language corresponding to the audio input and use that language to inform the analysis of the wake word portion.

The metric determination module 332 can comprise code that causes the processor(s) 316 to process features of the user device to derive metrics relating to various characteristics of the user device. For example, the metric determination module 332 can retrieve characteristics of the user device 302 (e.g., software features, device type, battery type) and can retrieve sensor data (e.g., from I/O device(s) 320) relating to the user device 302. The metric determination module 332 can process obtained device information to determine the metrics relating to the user device. Determining a series of metrics for the user device is discussed in greater detail with respect to FIG. 5.

The UID generation module 334 can comprise code that causes the processor(s) 316 to derive a user identifier that identifies the series of metrics. The UID can include an ordered tuple of the ephemeral metric, the software metric, the class metric, the network metric, the power metric, or the thermal metric in an order. The UID generation module 334 can generate a UID as described in step 426 as described in FIG. 4, for example.

The leader determination module 338 can comprise code that causes the processor(s) 316 to determine a leader device from the cluster of devices. The leader determination module 338 can process UIDs obtained for all devices in the cluster to determine a leader device for the cluster. The metrics included in all received UIDs can be arranged by metric type (e.g., ephemeral metric, software metric, class metric, network metric, power metric, thermal metric). The metrics for each device can be ranked based on the values provided in each metric.

In some embodiments, a value can be assigned to the ranking of each of the metric types for the devices in the cluster. For instance, an ephemeral metric can be assigned to each user device in the cluster. As an example, a mobile device can include an ephemeral metric of 5 indicating a higher likelihood of leaving the network and a video streaming device can include an ephemeral metric of 1 having a lower likelihood of leaving the network. A rank can be assigned to each ephemeral metric (e.g., a first rank to the video streaming device and a second rank to the mobile device). Metrics with the lowest order (e.g., ephemeral may be considered a first order metric) may be compared (e.g., from different devices), and the metrics can be ranked first based on the order. Second order metrics may then be compared and ranked next, and so on.

Assigned ranks of metrics can be used to select a leader device. In some instances, when metrics are the same or within a threshold similarity, other metrics can be processed to select a leader device. In such instances, a metric type corresponding to an order (e.g., as specified in the ordered tuple) can be processed to assign ranks to the metrics. A number of ranked metrics can be combined to generate an overall rank.

As an illustrative example, a cluster can include a mobile device, a speaker, and a video streaming device. Ranks can first be assigned to all ephemeral metrics of the devices to identify the video streaming device having a first rank, the speaker having a second rank, and the mobile device having the third rank. A network metric (e.g., a second metric type specified in the ordered tuple) can also be assigned ranks, providing a first rank to the video streaming device, a second rank to the mobile device, and a third rank to the speaker. In this example, an aggregate rank for each device can identify the video streaming device having the highest overall rank, and the video streaming device can be selected as the leader device. Assigning rankings to metrics to select a leader device is described in greater detail in FIG. 7.

Turning now to the details of the representative accessory device 306, the accessory device 306 can have, in some embodiments, at least one memory 350, a communications interface 352, processor(s) 354, a storage unit 356, and I/O devices 358. As described herein with respect to the user device 302, these elements of the accessory device can have the same appropriate hardware implementations as their counterparts on the user device 302.

The memory 350 of the accessory device 306 can include an operating system 364 and one or more application programs or services for implementing the features disclosed herein, including communications module 360, audio module 362, metric determination module 392, and UID generation module 394. As described herein with respect to the user device 302, the communications module 360 can have similar appropriate functionality as its counterpart communications module 324, the metric determination module 392 can have similar appropriate functionality as its counterpart metric determination module 332, UID generation module 394 can have similar appropriate functionality as its counterpart UID generation module 334, leader selection module 398 can have similar appropriate functionality as its counterpart leader selection module 338.

The audio module 362 may comprise code that causes the processor(s) 354, in conjunction with the I/O devices 358, to receive, process, and transmit audio signals. For example, the audio module 362 can receive a user utterance or other audio input at a microphone with the I/O devices 358 and transmit that audio data to the user device 302 over a streaming audio channel or other suitable connection. The audio module 362 can also receive response audio from the user device 302 and play that audio at a speaker within the I/O devices 358.

The memory 350 can comprise a speech detection module 372 and wake word module 374. Wake word module 374 can comprise code that causes processor(s) 354 to receive and process the wake word. For example, wake word module 374 can analyze a portion of an audio input to determine the presence of a wake word.

II. DETERMINING A LEADER DEVICE FOR A DEVICE CLUSTER

Figure 4:
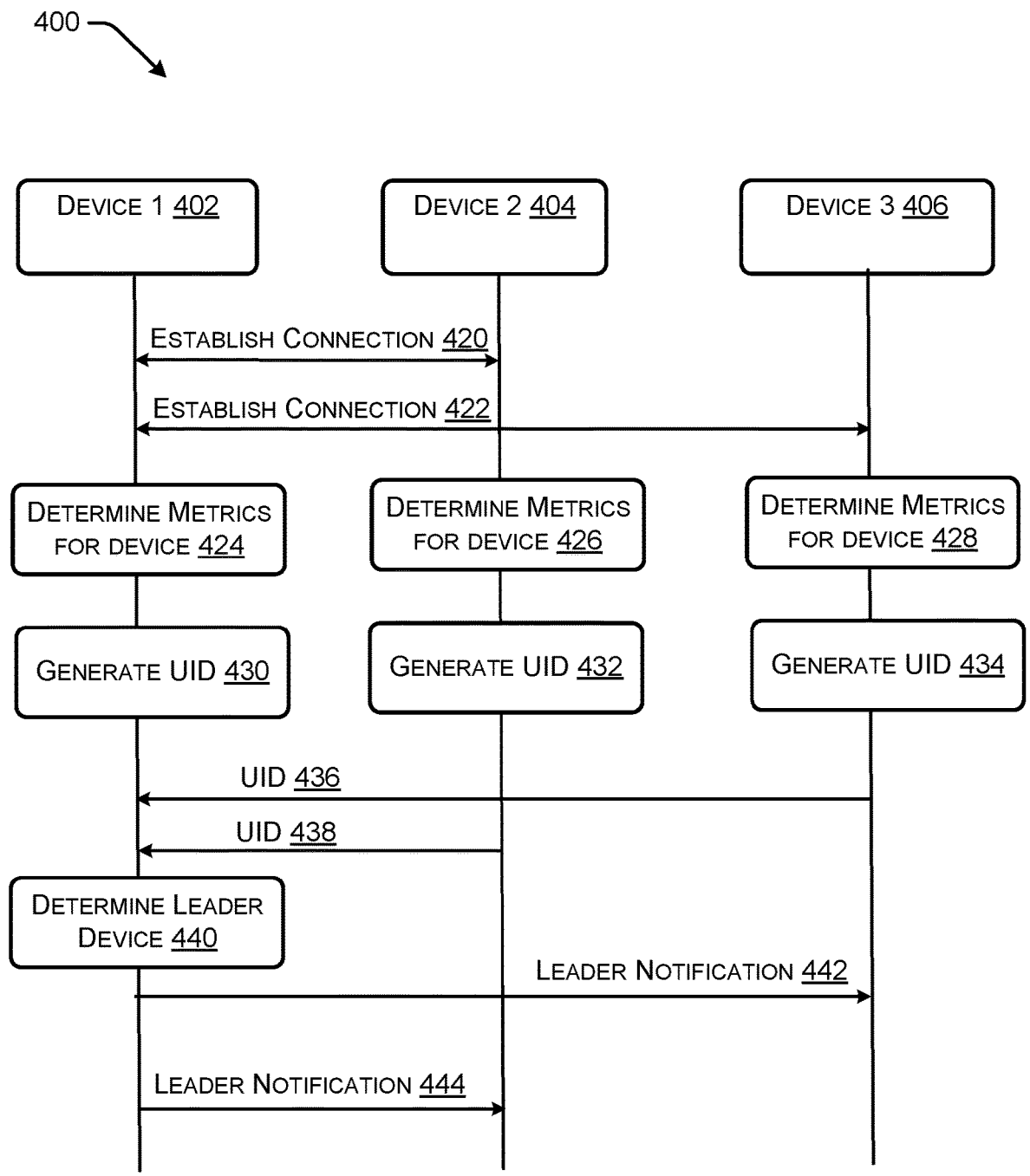
FIG. 4 illustrates an example signaling process for determining a leader device for a device cluster, according to some embodiments.

FIG. 4 illustrates an example signaling process 400 for determining a leader device for a device cluster, according to some embodiments. The device cluster can include a number of user devices (e.g., device 1 402, device 2 404, device 3 406, etc.) in a cluster of devices.

At block 420, the first device (e.g., device 1) 402 can establish a connection with device 2 404. The connection can be any type of wireless network connections such as, but not limited to, Bluetooth, Bluetooth LE, Wi-Fi, Zigbee (or other type of mesh protocol), or the like. At block 422, the device 1 402 can also establish a connection with device 3 406. Similar to the connection with device 2 404, the connection with device 3 406 can be made using any type of wireless network connection. In some examples, the connection established at block 420 and the connection established at block 422 may be made using the same type of connection (e.g., both may be Wi-Fi). However, in other examples, the connection established at block 420 may be a different connection type than the connection established at block 422 (e.g., the connection established at 420 may be Wi-Fi while the connection established at 422 may be Bluetooth LE, or some other combination of different connection types, as desired). Establishing the connection at block 420 can include obtaining data relating to devices 404, 406 (e.g., a device identifier, location of the device, device type) and establishing a connection with devices 404, 406.

At block 424, device 1 402 can determine a series of metrics for device 1 402 using characteristics of user device 1 402. Similarly, in block 426, device 2 404 can determine metrics for device 2 404 and at block 428, device 3 406 can determine metrics for device 3 406. In other words, each device can derive a series of metrics specified to each device. For instance, device 2 404 can identify characteristics relating to device 2 404 (e.g., software features of the device, a device type, capabilities of device components) and derive a series of metrics specific to device 2 404 using the identified characteristics. The characteristics can be read from a table/database or retrieved from processing sensor data.

In some embodiments, any device in a cluster can derive metrics on behalf of other devices in the cluster. For example, device 1 402 can obtain device characteristics of device 2 404 and generate a series of metrics for device 2 404. In some embodiments, device 1 402 can obtain device characteristics from other devices in the cluster (e.g., 404, 406) and derive the metrics for all devices in the cluster. Determining the metrics is described in greater detail with respect to FIG. 5.

At block 430, device 1 402 can generate a UID for device 1 402 based on the series of metrics. Similarly, at block 432, device 2 404 can generate a UID for device 2 404 based on the series of metrics and, at block 434, device 3 406 can generate a UID for device 3 406 based on the series of metrics. The UID can include an ordered tuple comprising the series of metrics.

At blocks 436 and 438, devices 404 and 406 can transmit respective UIDs to device 1 402. Device 1 402 can obtain UIDs from all devices in the cluster and identify all metrics included in the UIDs for processing.

At block 440, device 1 402 can determine a leader device. While device 1 402 is shown as determining the leader device, any device in the cluster can be capable of deriving a leader device as described herein. Device 1 402 can parse the UIDs (e.g., received in blocks 436, 438) to identify metrics included in each UID and arrange the metrics by metric type. The leader device can be selected based on a comparison of various metrics of the user devices as provided by the UIDs. For instance, metrics can be assigned ranks by metric type in an order as specified in the ordered tuple included in the UIDs. The arranged metrics can be processed to select a leader device as described herein.

Further, the series of metrics (and respective UIDs) can be forwarded to any device in the cluster. While device 1 402 is shown as selecting the leader device, any device in the cluster can select the leader device. Alternatively, each device in the cluster may make the determination. In this case, it is presumed that each device would make the same determination, given the same set of metrics and leader determination logic. Thus, all devices may determine a particular leader from the cluster, and then that particular device will become the leader.

At blocks 442 and 444, device 1 402 can notify devices 404 and 406, respectively, of the leader device in a leader notification message. In some embodiments, the leader notification can identify the leader device to devices in the cluster.

Figure 5:
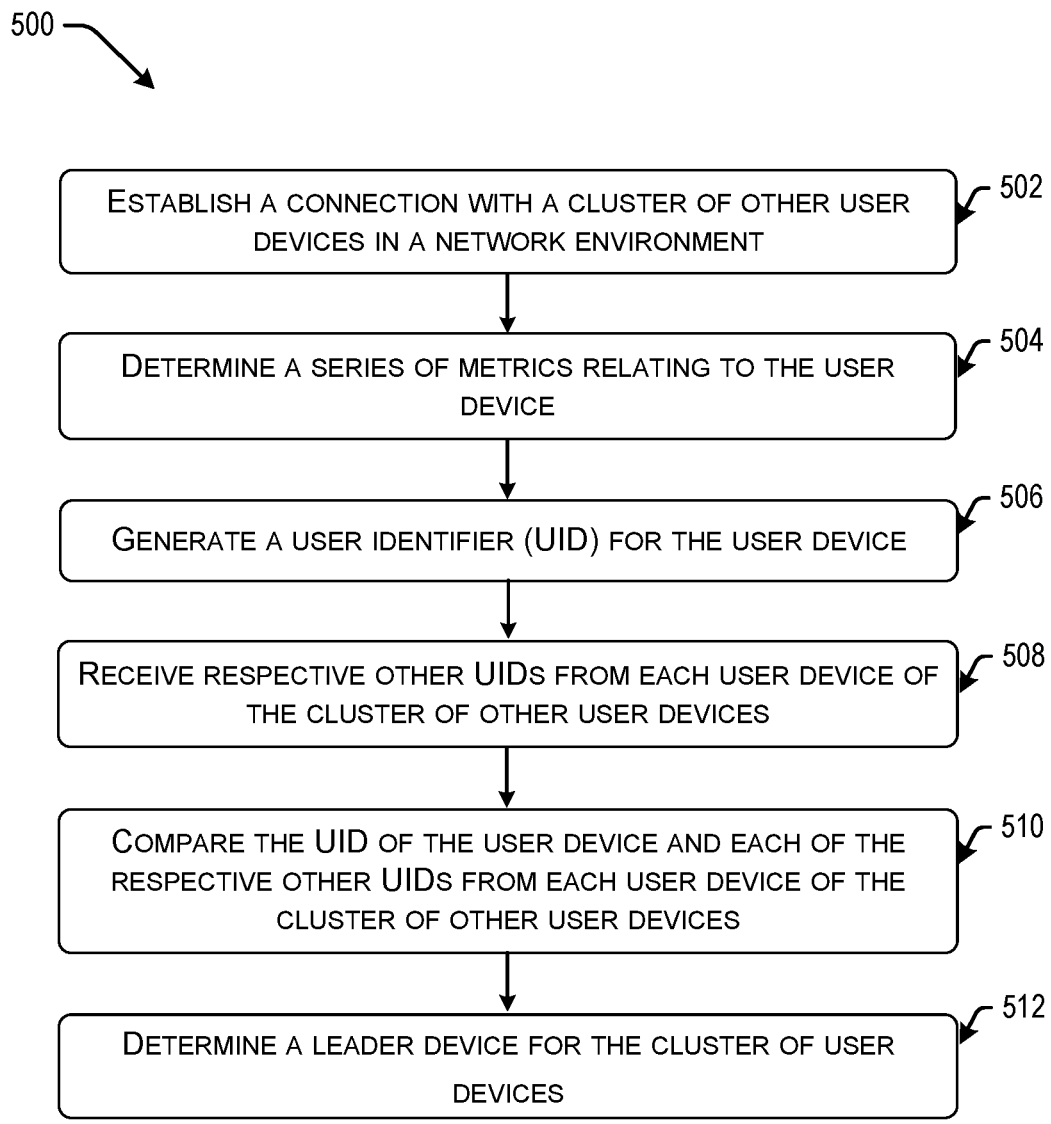
FIG. 5 is a block diagram of an example method for determining a leader device for a cluster of user devices, according to some embodiments.

FIG. 5 is a block diagram 500 of an example method for determining a leader device for a cluster of user devices, according to some embodiments. The method can be performed by a user device as described herein.

At block 502, the user device can establish a connection with a cluster of other user devices in a network environment. This can include identifying devices in the cluster and obtaining information identifying the devices in the cluster. In some examples, the devices may need to perform a pairing or some handshake in order to connect with each other. In other examples, the devices may merely connect to an access point via Wi-Fi, and be informed about addresses (e.g., IP addresses or the like) of the other devices on the network.

At block 504, the user device can determine a series of metrics relating to the user device. The series of metrics can include metrics specifying characteristics (e.g., capabilities and features) of each user device in the cluster. For example, the series of metrics can include an ephemeral metric estimating a likelihood that the user device will maintain the connection with the cluster for over a threshold amount of time, a software metric identifying a software version installed of software (e.g., an application or an operating system (OS)) on the user device, a class metric identifying a device class of the user device, a network metric identifying a network capability of the user device, an entropy metric, a power metric identifying a power capability of the user device, and a thermal metric identifying a processing capability of the user device prior to the user device shutting down due to overheating.

Determining the series of metrics can include obtaining a series of user device characteristics specific to the user device. For example, this can include identifying a device type, whether the device is wired/wireless, is battery powered, what software version the device has installed, etc. The series of user device characteristics can also specify capabilities of the user device, such as a maximum data transmission capability of the device, a power capacity of the device, a maximum processing capability of the device, etc.

As noted above, the series of metrics can include various metric types. Example metric types include an ephemeral metric, a software metric, a class metric, a network metric, a power metric, a thermal metric, etc. A subset of user device characteristics can be identified for each metric type. For example, for the thermal metric, characteristics relating to a processing power of the device, a temperature of the user device, an estimated processing power that causes overheating, etc.

Each subset of the user device characteristics can be compared with a range of capability metrics specific to each metric to identify a portion of the range of capability metrics that corresponds to the subset of user device characteristics. For example, a network metric can include a network throughput capability of the user device. The network throughput capability can be compared with a range of network capability metrics to identify a metric that corresponds with the network throughput capability. The metric can be represented as a value in a range of values. A metric can be derived for each type of metric of the series of metrics. Determining the series of metrics are described in greater detail in FIG. 6.

At block 506, the user device can generate a user identifier (UID) for the user device. The UID can provide the series of metrics for the user device. In some embodiments, the UID comprises an ordered tuple that includes, in order, at least one of the ephemeral metric, the software metric, the class metric, the network metric, the power metric, or the thermal metric.

At block 508, the user device can receive respective other UIDs from each user device of the cluster of other user devices. In some instances, the user device can receive UIDs for all devices in the cluster. In other embodiments, the user device can obtain device characteristics of any devices in the cluster and derive UIDs for the other user devices using the obtained device characteristics.

At block 510, the user device can compare the UID of the user device and each of the respective other UIDs from each user device of the cluster of other user devices. This can include arranging metric data included in the UIDs for processing.

At block 512, the user device can determine a leader device for the cluster of leader devices. The user device can compare the metrics included in the UIDs for all user devices to determine a user device to become the leader device. This can include assigning ranks to the metrics for each user device and determining a user device with the highest overall ranking. Determining a leader device is discussed in greater detail in FIG. 7.

In some embodiments, the user device can aggregate each of the ephemeral metric, the software metric, the class metric, the network metric, the power metric, and the thermal metrics using each UID of each user device in the cluster of user devices to generate an overall metric for each user device in the cluster of user devices. The user device can process data included in received UIDs to identify various metric types for each user device in the cluster to compare the metrics and select a leader device. The user device can assign a rank to metrics for each user device in the cluster of user devices that can be used to select a leader device for the cluster of user devices.

The user device can transmit a leader notification to each other device of the cluster of user devices identifying the leader device. The leader deceive can be configured to direct data packets across the user devices in the cluster of user devices and coordinate state information of the cluster of user devices.

In some embodiments, devices can leave/enter the cluster of devices. For example, a device can be ephemeral in nature and can leave the cluster of devices for an amount of time. As another example, a new device can be added to the cluster. The user device can establish a connection to the new user device and receive a new UID for the new user device. The user device can compare the UID of the user device, each of the respective other UIDs from the cluster of other user devices, and the new UID of the new user device to determine a new leader device of the cluster of user devices. The user device can transmit an updated leader notification to each other device of the cluster of devices specifying the new leader device of the cluster of user devices.

III. METRIC GENERATION

Figure 6:
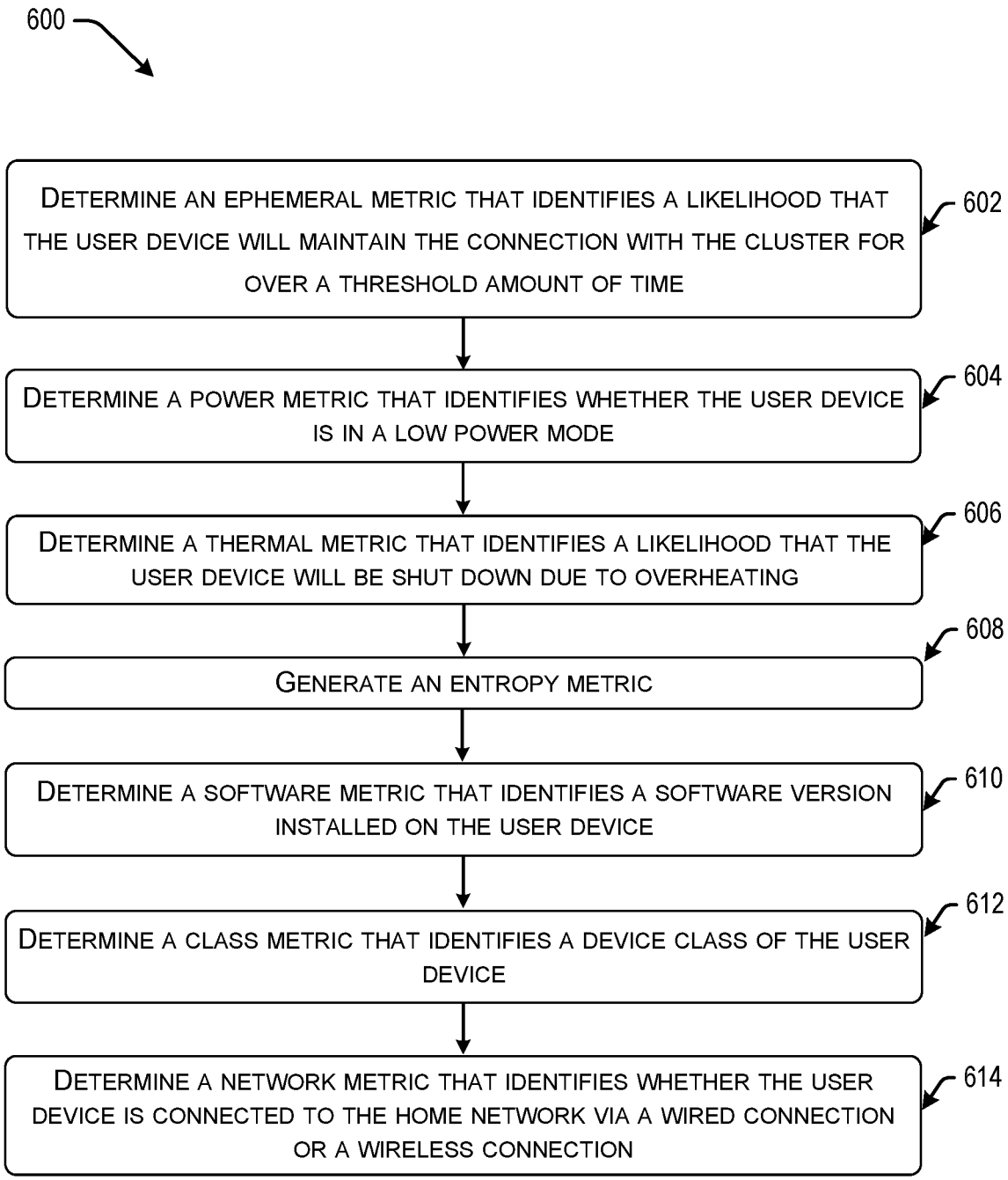
FIG. 6 is a block diagram for generating a series of metrics, according to some embodiments.

FIG. 6 is a block diagram 600 for generating a series of metrics, according to some embodiments. As noted in step 504 in FIG. 5 above, a series of metrics can be derived for each user device in the cluster. The metrics can represent capabilities or features unique to the user device. The metrics can be used to compare user devices to determine a leader device of the cluster.

In some instances, to determine the metrics, user device characteristics can be obtained. The user device characteristics can include features specific to the user device, such as processor type, network interface type (e.g., wired or wireless), battery capacity, device type, software version, etc. A subset of the user device characteristics that relate to each metric can be identified and each subset of the user device characteristics with a range of capability metrics specific to each metric to identify a portion of the range of capability metrics that corresponds to the subset of user device characteristics. As an example, a subset of user device characteristics can indicate a network throughput capability of the user device. The network throughput capability can be compared with a range of network throughput values to identify a network throughput that corresponds with the network throughput capability of the device.

At block 602, the user device can determine an ephemeral metric estimating a likelihood that the user device will maintain the connection with the cluster for over a threshold amount of time. As noted above, many devices are ephemeral in nature, with a high likelihood of leaving the network for an amount of time. For example, a mobile phone is more ephemeral in nature than a video streaming device connected to a television, as the video streaming device is designed to remain connected to the television and may include a wired connection to the television. The ephemeral metric may be used in determining a leader device because, in many instances, the leader device should be a device that has a lower likelihood of leaving the network. This can reduce the number of times a new leader device needs to be determined when a current leader devices leaves the network. Thus, in some examples, the election logic may be configured to avoid assigning the leader role to ephemeral devices by weighting this metric the highest and/or eliminating all ephemeral devices from consideration (e.g., assuming there is at least one non-ephemeral device in the cluster).

The user device can identify a subset of characteristics relating to the user device, such as whether the user device includes a wired or wireless network interface, whether the user device is battery powered or plugged into a power source, whether the device type is mobile or static, a time of the device being included in the cluster of devices, etc. Each of the identified characteristics can be processed to derive a metric from the characteristics. For instance, the metric can be derived by adding a value to the metric for each characteristic that indicates that the device is less ephemeral in nature. For example, a value can be added to the metric responsive to determining that the user device is plugged into a power outlet. The ephemeral metric can indicate how ephemeral each user device is in the cluster.

As an example, a cluster can include both a tablet computer and a video streaming device. The tablet computer can be battery powered, while the video streaming device requires to be plugged into an electrical outlet. Due to the power source being a battery, the tablet computer can be more ephemeral in nature, and the tablet computer can have a lower ephemeral metric than the video streaming device. As another example, a cluster can include a first tablet computer with cellular connectivity and a second tablet computer without cellular connectivity (e.g., only network connectivity is via Wi-Fi). Because the first tablet computer with cellular connectivity is more likely to leave the home (e.g., since it will still have network access away from an access point of the home), it may be more ephemeral in nature; thus, the first tablet computer may have a lower ephemeral metric than the second tablet computer.

At block 604, the user device can determine a power metric identifying a power capability of the user device. The power metric can specify a maximum processing capacity and an average processing usage of the user device. In some instances, a device class of each user device can be utilized in generation of the power metric. For example, a class of devices including smart speaker devices and smart media streaming devices can include a coordinator class of devices with a greatest processing power of all device classes. In this example, devices of this class can be assigned a greatest power metric based on the greatest processing power of all device classes.

A greater processing capacity and lower processing usage can be beneficial for a user device, as the leader device may require additional processing resources to perform various processing tasks. The identified maximum processing capacity and an average processing usage for the user device can be compared with a range of processing values to identify a value that corresponds with the maximum processing capacity and an average processing usage of the device.

At block 606, the user device can determine a thermal metric identifying a processing capability of the user device prior to the user device shutting down due to overheating. The thermal metric can specify a capability of the device to perform processing tasks prior to shutting down or entering an energy-conserving mode due to overheating. In some instances, the thermal metric can include a calculated remaining time before the device shuts down. For example, the thermal metric can include a calculated estimated time left on a remaining battery power given the average power resources used by the device and an average temperature of the device.

The user device can obtain characteristics relating to an average processing power of the device, a temperature of the device, and a specified temperature and processing power that would cause overheating of the device. The thermal metric can include a value specifying an amount of computing resources available for the user device before the user device is likely to overheat or shut down. For example, a maximum processing capability of the user device prior to the user device overheating can be compared with a range of maximum processing capability values to identify a first maximum processing capability value that corresponds with maximum processing capability of the user device prior to the user device overheating. In this example, the thermal metric can be determined as corresponding with the first maximum processing capability value.

At block 608, the user device can determine an entropy metric. The entropy metric can be derived based on a number of bits (e.g., 128 bits) specifying a random number to provide randomness in selecting a leader device. The entropy metric can provide a last-order ranking to mitigate repeatedly selecting a single user device as the user device. For example, if determining a leader device results in repeatedly identifying a first user device as the leader device, the entropy metric can modify the selection of the leader device to periodically select a leader device to not always select the first user device as the leader device.

At block 610, the user device can determine a software metric identifying a software version installed on the user device. The software metric can specify the software version of the user device in relation to a most recent software version available for the user device. Identifying a software version of the user device can identify cybersecurity capabilities or features of the user device, for example. The software version of the device can be obtained and compared with a most recent software version available for the device. The software metric can include a value indicative of how recent the software version of the device (e.g., operating system version, application version) is to the most recent software version available.

At block 612, the user device can determine a class metric identifying a device class of the user device. A device class can include a type of device capable of being included in a cluster of user devices. Example device classes can include mobile computing devices, personal computers, Internet of Things (IoT) sensors, IoT accessories (e.g., a smart thermostat, a video-enabled doorbell, or other smart home devices), etc. Other device classes might be based on processing power. Some classes of devices can be identified as more preferable to be leader devices in networks than other device classes. For example, a class of devices including smart home devices may be more desirable to be leader devices than a mobile computing device or a IoT sensor.

The user device can compare a device type of the user device and identify a class of device from a listing of device classes. A value can be provided based on the device class according to the listing of device classes to generate the class metric.

At block 614, the user device can determine a network metric identifying a network capability of the user device. The network device can specify a maximum network capability (e.g., throughput) and average available bandwidth of the user device. The network capability of the user device can allow for processing tasks relating to a leader device to be performed. The network capability can specify network type(s) (e.g., Wi-Fi, cellular communication network, short-range wireless communication) and whether the device is wired or wireless.

The user device can identify an overall network capability and an average available bandwidth of the device. These values can be compared against a range of network capabilities and available bandwidth values and assign a network metric in accordance with the range of network capabilities and available bandwidth values.

IV. LEADER DEVICE DETERMINATION

Figure 7:
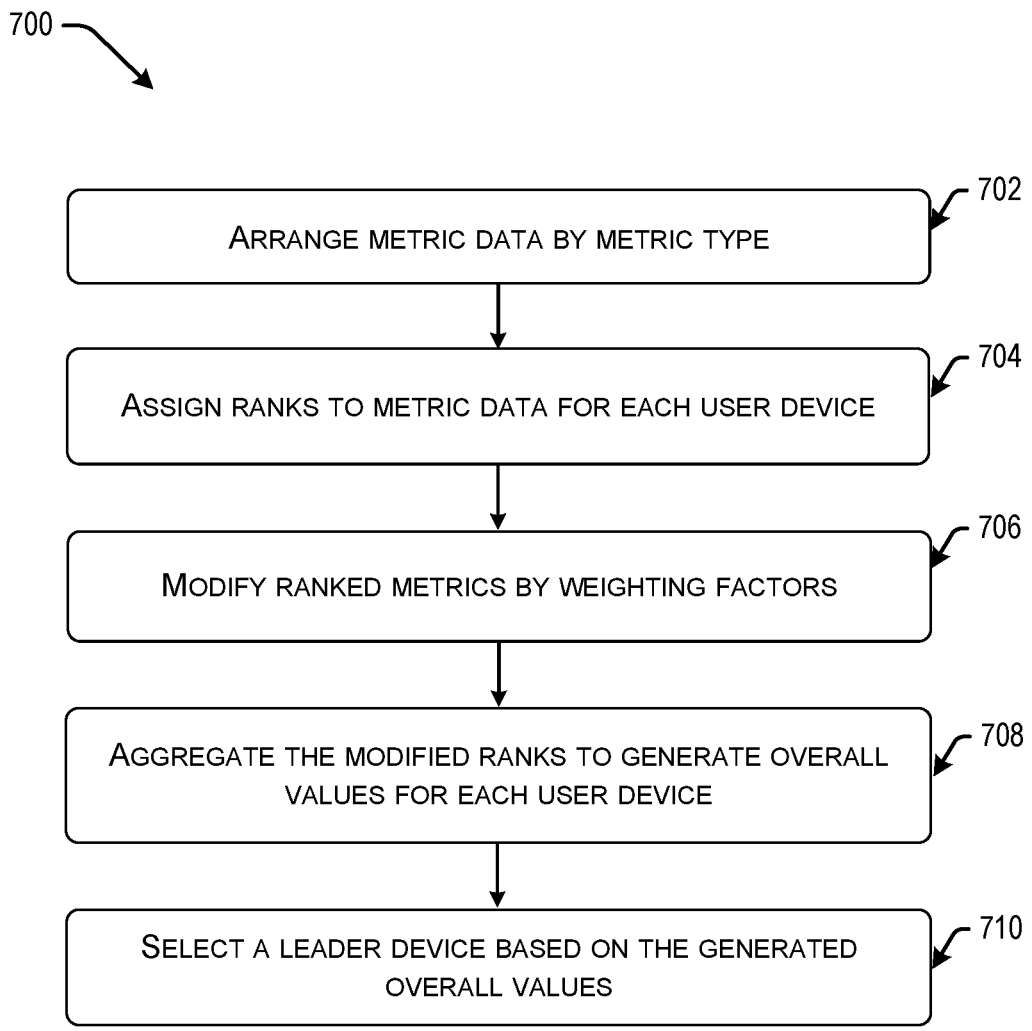
FIG. 7 illustrates a block diagram of a method for determining a leader device, according to some embodiments.

FIG. 7 illustrates a block diagram 700 of a method for determining a leader device, according to some embodiments. The steps as specified in FIG. 7 can relate to determining a leader device as described herein (e.g., at block 432 of FIG. 4 or step 512 of FIG. 5, for example).

At block 702, the user device can arrange metric data by metric type. As noted above, UIDs of the user devices in the cluster can include a series of metrics. Each metric can be identified in the UIDs and arranged by metric type for all user devices in the cluster. For example, each thermal metric can be identified from each UID and arranged such that the thermal metrics can be compared as described below.

At block 704, the user device can assign ranks to each metric relating to the user devices in the cluster. The assigned ranks can quantify a capability of each user device with respect to other user devices in the cluster. As an illustrative example, a cluster comprising a first user device, a second user device, and a third user device each include a respective network metric. For example, the network metrics can specify a combination of a maximum throughput (e.g., in megabits per second (mbps)) and an average amount of bandwidth available (e.g., in mbps) for each device. In this example, the assigned ranks can specify that a second user device has a highest network metric, the third user device has a second-highest network metric, and the first user device has a third-highest network metric. The assigned ranks can include values identifying the rank of each user device with respect to each metric type.

In some embodiments, the ranked metric types for the user devices in the cluster can be prioritized according to a specified order. The order can specify a relative priority of metric types in selecting a leader device. The order can be provided in the ordered tuple, as described above. For example, the ephemeral metric can be in a first position of the order in the ordered tuple, as devices that are ephemeral in nature are less desirable as leader devices given the higher likelihood of such devices leaving the network.

UIDs for all devices in a cluster can be processed to identify all ephemeral metrics for the devices in the cluster. In some instances, the leader device can be selected as a device with a lowest ephemeral metric. In other instances, a number of devices can be removed from consideration as the leader device if the ephemeral metric exceeds a threshold metric.

In some embodiments, the ephemeral metrics for all devices in the cluster can be assigned ranks. For example, a first device can include a first assigned rank for the ephemeral metric because that device has a lowest ephemeral metric of all devices in the cluster.

In some embodiments, all or a portion of the metric types provided in the UIDs can be assigned ranks for selection of the leader device. The assigned ranks can be aggregated for each device in the cluster, and a device with a highest assigned rank can be selected as the leader device.

In some instances, the order as specified in the ordered tuple can specify various flags prioritizing various device types, such as if the device is wired, if there is a power risk (e.g., a user device having a maximum power capacity below a threshold level), etc. As an example, a flag can include an instruction to prioritize devices that are powered via a static power source (e.g., plugged into an electrical outlet) rather than devices that are battery powered.

At block 706, the user device can modify the ranked metrics by a series of weighting factors. The weighting factors can modify the ranked metrics according to a priority of each metric type in selecting the leader device. For example, the weighting factors can include modification values according to the order described herein. Each rank assigned to the user devices by metric type can be modified by the modification value to generate the modified rank values.

At block 708, the user device can aggregate the modified rank values for each user device to generate an overall value for each user device. The overall value can include a combination of all rank values for each device. The overall value can be used to select the leader device as described below.

At block 710, the user device can select a leader device from the cluster of user devices using the overall values for each device. For example, the user device can select a first device as the leader device by determining that the first device has a highest overall value. The user device can notify devices in the cluster of the selected leader device.

V. CONCLUSION

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The various embodiments further can be implemented in a wide variety of operating environments, which in some cases can include one or more user computers, computing devices or processing devices that can be used to operate any of a number of applications. User or client devices can include any of a variety of different types of computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory ("EEPROM"), flash memory or other memory technology, CD-ROM, DVD or other optical storage, magnetic cassettes, magnetic tape, magnetic disk storage or other magnetic storage devices or any other medium that can be used to store the desired information and that can be accessed by a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode. Variations of those preferred embodiments may become apparent to those of ordinary skill in the art upon reading the foregoing description. It is expected that skilled artisans should be able to employ such variations as appropriate, and it is intended for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method performed by a user device for determining a leader device for a cluster of user devices, the method comprising:
   establishing, by the user device, a connection with a cluster of other user devices in a network environment;
   determining, by the user device, a series of metrics relating to capabilities of the user device, the series of metrics including at least:
      an ephemeral metric estimating a likelihood that the user device will maintain the connection with the cluster for over a threshold amount of time;
   generating, by the user device, a user identifier (UID) for the user device, the UID providing the series of metrics for the user device;
   receiving, by the user device, respective other UIDs from each user device of the cluster of other user devices; and
   comparing, by the user device, the UID of the user device and each of the respective other UIDs from each user device of the cluster of other user devices to determine the leader device of the cluster of user devices.

2. The method of claim 1, wherein the UID comprises an ordered tuple that includes, in order, the ephemeral metric and other metrics.

3. The method of claim 1, further comprising:
   aggregating, using each UID of each user device in the cluster of user devices, each of the ephemeral metric and the other metrics to generate an overall metric for each user device in the cluster of user devices; and
   assigning, by the user device, a rank value to each user device in the cluster of user devices based at least in part on overall metrics for each user device in the cluster of user devices, wherein determining the leader device includes identifying a first user device in the cluster of user devices that includes a highest rank value of the cluster of user devices.

4. The method of claim 1, further comprising:
   transmitting, by the user device, a leader notification to each other device of the cluster of user devices identifying the leader device, the leader device configured to direct data packets across the user devices in the cluster of user devices and coordinate state information of the cluster of user devices.

5. The method of claim 1, wherein determining the series of metrics of the user device further comprises:
   obtaining, by the user device, a series of user device characteristics specific to the user device;

for each metric of the series of metrics, identifying a subset of the user device characteristics that relate to each metric; and comparing each subset of the user device characteristics with a range of capability metrics specific to each metric to identify a portion of the range of capability metrics that corresponds to the subset of user device characteristics.

6. The method of claim 1, further comprising:

identifying, by the user device, that a new user device is introduced to the cluster;

establishing, by the user device, a connection to the new user device;

receiving, by the user device, a new UID for the new user device;

comparing, by the user device, the UID of the user device, each of the respective other UIDs from the cluster of other user devices, and the new UID of the new user device to determine a new leader device of the cluster of user devices; and transmitting an updated leader notification to each other device of the cluster of user devices specifying the new leader device of the cluster of user devices.

7. A non-transitory computer-readable storage medium having stored thereon computer-executable instructions that, when executed by a processor of a user device, cause the processor to perform operations comprising:

establishing, by the user device, connection with a cluster of other user devices in a network;

determining, by the user device, a series of metrics relating to capabilities of the user device, the series of metrics including at least an ephemeral metric that identifies a likelihood that the user device will maintain the connection with the cluster for over a threshold amount of time;

generating, by the user device, a user identifier (UID) for the user device, the UID including the series of metrics;

receiving, by the user device, respective other UIDs from each of the other user devices in the network;

comparing, by the user device, the UID of the user device and each of the respective other UIDs from each of the other user devices; and determining, by the user device, a leader of the cluster based at least in part on the comparison.

8. The non-transitory computer-readable storage medium of claim 7, wherein determining the series of metrics further comprise:

determining, by the user device, a power metric that identifies whether the user device is in a low power mode;

determining, by the user device, a thermal metric that identifies a likelihood that the user device will be shut down due to overheating;

generating, by the user device, an entropy metric;

determining, by the user device, a software metric that identifies a software version installed on the user device; and determining, by the user device, a class metric that identifies a device class of the user device; and determining, by the user device, a network metric that identifies whether the user device is connected to the network via a wired connection or a wireless connection.

9. The non-transitory computer-readable storage medium of claim 8, wherein determining the thermal metric further comprises:

processing user device characteristics specific to the user device to identify a subset of characteristics relating to a maximum processing capability of the user device prior to the user device overheating;

comparing the subset of characteristics with a range of maximum processing capability values to identify a first maximum processing capability value that corresponds with the subset of characteristics; and determining the thermal metric as corresponding with the first maximum processing capability value.

10. The non-transitory computer-readable storage medium of claim 8, wherein the UID comprises an ordered tuple that includes, in order, at least one of the ephemeral metric, the power metric, the thermal metric, the entropy metric, the software metric, the class metric, or the network metric.

11. The non-transitory computer-readable storage medium of claim 7, wherein comparing the UID of the user device and each of the respective other UIDs from each of the other user device includes:

assigning a rank for each user device in the cluster of user devices based at least in part on a combination of the series of metrics from the UID for each device, wherein the leader device is selected based at least in part on a first user device with a first rank.

12. The non-transitory computer-readable storage medium of claim 11, wherein the computer-executable instructions further cause the processor to perform operations comprising:

detecting that the selected leader device is no longer in the cluster of user devices;

comparing, by the user device, the UID of the user device and each of the respective other UIDs from each of the other user devices not including the leader device to determine a new leader device; and transmitting a leader notification to the other devices in the cluster specifying the new leader device.

13. The non-transitory computer-readable storage medium of claim 7, wherein the computer-executable instructions further cause the processor to perform operations comprising:

identifying, by the user device, that a new user device is added to the cluster of user devices;

establishing, by the user device, a connection to the new user device;

receiving, by the user device, a new UID for the new user device;

comparing, by the user device, the UID of the user device, each of the respective other UIDs from each user device of the cluster of other user devices, and the new UID of the new user device to determine a new leader of the cluster; and transmitting a leader notification to each other device of the cluster of user devices specifying the leader of the cluster of user devices.

14. A user device included in a cluster of user devices that is configured to determine a leader device of the cluster of user devices, the user device comprising:

a memory configured to store computer-executable instructions; and a processor configured to connect to the memory and execute the computer-executable instructions to at least:

establish a connection with a cluster of other user devices in a network environment;

determine a series of metrics relating to the user device, the series of metrics including at least an ephemeral metric that identifies a likelihood that the user device will maintain the connection with the cluster for over a threshold amount of time;

generate a user identifier (UID) for the user device, the UID comprising an ordered tuple of the series of metrics;

receive respective other UIDs from each user device of the cluster of other user devices; and compare the UID of the user device and each of the respective other UIDs from each user device of the cluster of other user devices to determine the leader device of the cluster of user devices.

15. The user device of claim 14, wherein the series of metrics comprises:

the ephemeral metric;

a software metric identifying a software version installed on the user device;

a class metric identifying a device class of the user device;

a network metric identifying a network capability of the user device;

a power metric identifying a power capability of the user device; and a thermal metric identifying a processing capability of the user device prior to the user device shutting down due to overheating.

16. The user device of claim 15, wherein the UID comprises an ordered tuple that includes, in order, at least one of the ephemeral metric, the software metric, the class metric, the network metric, the power metric, or the thermal metric.

17. The user device of claim 15, wherein the processor further executes the computer-executable instructions to at least:

aggregate, using each UID of each user device in the cluster of user devices, each of the ephemeral metric, the software metric, the class metric, the network metric, the power metric, and the thermal metric to generate an overall metric for each user device in the cluster of user devices; and assign a rank to each user device in the cluster of user devices based at least in part on overall metrics for each user device in the cluster of user devices, wherein determining the leader device includes identifying a first user device in the cluster of user devices that includes a first assigned rank of the cluster of user devices.

18. The user device of claim 14, wherein the processor further executes the computer-executable instructions to at least:

transmit a leader notification to each other device of the cluster of user devices identifying the leader device, the leader device configured to direct data packets across the user devices in the cluster of user devices and coordinate state information of the cluster of user devices.

19. The user device of claim 14, wherein determining the series of metrics of the user device further comprises:

obtain a series of user device characteristics specific to the user device;

for each metric of the series of metrics, identify a subset of the user device characteristics that relate to each metric; and compare each subset of the user device characteristics with a range of capability metrics specific to each metric to identify a portion of the range of capability metrics that corresponds to the subset of user device characteristics.

20. The user device of claim 14, wherein the processor further executes the computer-executable instructions to at least:

identify that a new user device is introduced to the cluster;

establish a connection to the new user device;

receive a new UID for the new user device;

compare the UID of the user device, each of the respective other UIDs from the cluster of other user devices, and the new UID of the new user device to determine a new leader device of the cluster of user devices; and transmit an updated leader notification to each other device of the cluster of user devices specifying the new leader device of the cluster of user devices.

\* \* \* \* \*